(12) United States Patent
Oh et al.

(10) Patent No.: US 11,613,053 B2
(45) Date of Patent: Mar. 28, 2023

(54) METHOD FOR MANUFACTURING SECONDARY BATTERY, METHOD FOR MANUFACTURING POUCH FOR SECONDARY BATTERY, AND POUCH FOR SECONDARY BATTERY

(71) Applicant: LG Chem, Ltd., Seoul (KR)

(72) Inventors: Sei Woon Oh, Daejeon (KR); Soo Ji Hwang, Daejeon (KR); Jung Hwa Jung, Daejeon (KR); Ho Sub Lee, Daejeon (KR); Jin Seo Park, Daejeon (KR)

(73) Assignee: LG Energy Solution, Ltd.

( * ) Notice: Subject to any disclaimer, the term of this patent is extended or adjusted under 35 U.S.C. 154(b) by 617 days.

(21) Appl. No.: 16/611,680

(22) PCT Filed: Dec. 10, 2018

(86) PCT No.: PCT/KR2018/015622
§ 371 (c)(1),
(2) Date: Nov. 7, 2019

(87) PCT Pub. No.: WO2019/151638
PCT Pub. Date: Aug. 8, 2019

(65) Prior Publication Data
US 2020/0168852 A1 May 28, 2020

(30) Foreign Application Priority Data
Jan. 31, 2018 (KR) .......... 10-2018-0012481

(51) Int. Cl.
*H01M 50/105* (2021.01)
*B29C 43/20* (2006.01)
(Continued)

(52) U.S. Cl.
CPC ........... *B29C 43/203* (2013.01); *B29C 53/02* (2013.01); *H01M 50/105* (2021.01); *B29K 2705/02* (2013.01); *B29L 2031/7146* (2013.01)

(58) Field of Classification Search
CPC .............. H01M 50/105; H01M 50/10; H01M 50/131; Y02W 60/10; Y02E 60/10
See application file for complete search history.

(56) References Cited

U.S. PATENT DOCUMENTS

| 2011/0287308 A1 | 11/2011 | Kim et al. |
| 2012/0177953 A1 | 7/2012 | Bhardwaj et al. |
| 2014/0220413 A1* | 8/2014 | Moon ............... H01M 50/20 156/221 |

(Continued)

FOREIGN PATENT DOCUMENTS

| EP | 2802023 A1 | 11/2014 |
| JP | H11224652 A | 8/1999 |

(Continued)

OTHER PUBLICATIONS

Extended European Search Report including Written Opinion for Application No. EP18903305.3, dated Jul. 2, 2020, pp. 1-8.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

Disclosed is a method for manufacturing a secondary battery.
According to the present invention, a problem of weakening durability of a pouch, which may occur in a process of forming cups having different depths in the pouch may be solved.

13 Claims, 3 Drawing Sheets

(51) Int. Cl.
B29C 53/02 (2006.01)
B29K 705/02 (2006.01)
B29L 31/00 (2006.01)

(56) References Cited

U.S. PATENT DOCUMENTS

| | | | |
|---|---|---|---|
| 2015/0044547 A1 | 2/2015 | Lee et al. | |
| 2016/0380302 A1* | 12/2016 | Yun | H01M 10/0587 29/623.5 |
| 2017/0358783 A1* | 12/2017 | Kim | H01M 10/613 |
| 2019/0189984 A1* | 6/2019 | Han | H01M 10/0422 |

FOREIGN PATENT DOCUMENTS

| | | |
|---|---|---|
| JP | 2001229888 A | 8/2001 |
| JP | 2002110250 A | 4/2002 |
| JP | 2002367574 A | 12/2002 |
| JP | 200471301 A | 3/2004 |
| JP | 2013206678 A | 10/2013 |
| KR | 20060037827 A | 5/2006 |
| KR | 20110128594 A | 11/2011 |
| KR | 20120051424 A | 5/2012 |
| KR | 101253671 B1 | 4/2013 |
| KR | 101273472 B1 | 6/2013 |
| KR | 20130131522 A | 12/2013 |
| KR | 101403692 B1 | 6/2014 |
| KR | 20140140313 A | 12/2014 |

OTHER PUBLICATIONS

International Search Report from Application No. PCT/KR2018/015622 dated Mar. 15, 2019, 2 pages.

* cited by examiner

METHOD FOR MANUFACTURING SECONDARY BATTERY, METHOD FOR MANUFACTURING POUCH FOR SECONDARY BATTERY, AND POUCH FOR SECONDARY BATTERY

CROSS-REFERENCE TO RELATED APPLICATIONS

The present application is a national phase entry under 35 U.S.C. § 371 of International Patent Application No. PCT/KR2018/015622, filed on Dec. 10, 2018, published in Korean, which claims priority from Korean Patent Application No. 10-2018-0012481, filed on Jan. 31, 2018, the disclosures of which are hereby incorporated by reference in their entireties.

TECHNICAL FIELD

The present invention relates to a method for manufacturing a secondary battery and a pouch for the secondary battery, and more particularly, to a method for manufacturing a secondary battery, which is capable of solving a problem of deteriorating durability of a case, which occurs when the case of the secondary battery is formed, and a pouch for the secondary battery.

BACKGROUND ART

There are various types of secondary batteries that are repeatedly chargeable and dischargeable. For example, a pouch type secondary battery represents a secondary battery that is manufactured by sealing an exterior after an electrode assembly and an electrolyte are accommodated in the pouch exterior.

Here, in order to form a space, which accommodates the electrode assembly, in the exterior, a process of manufacturing the pouch type secondary battery includes a step of pressing a portion of an area of a pouch to concavely recess the portion of the area of the pouch so as to form a cup having a predetermined depth.

As described above, in the step of forming the cup in the pouch, according to the related art, two cups are formed. That is, a first area and a second area spaced apart from the first area of the pouch are pressed to form the two cups. Thereafter, an area between the two cups of the pouch are folded so that the two cups face each other. Thus, the electrode assembly is accommodated in a space formed as the two cups face each other.

In recent years, an electric capacity required for the secondary battery is increasing. The capacity of the secondary battery is directly linked to a size of the electrode assembly provided in the secondary battery. That is, the electrode assembly has to have a large size so as to manufacture a secondary battery having a large capacity. This means that the inner space of the case in which the electrode assembly is accommodated has to increase in volume. However, it is a reality that the volume of the internal space of the case in which the electrode assembly is accommodated does not indefinitely increase due to various constraints.

Particularly, in the case of the pouch type secondary battery, there is a problem that a depth of the cup formed in the pouch does not increase indefinitely. That is, when each of the cups formed in the pouch has a depth greater than a predetermined depth, minute cracks or the like occur in the pouch, and thus, the pouch is easily broken, and a vulnerable area such as an area on which a whitening phenomenon, in which the pouch is whitened around the cracks, occurs is generated. This acts as a limiting condition in increasing of the capacity of the pouch type secondary battery.

DISCLOSURE OF THE INVENTION

Technical Problem

Thus, an object of the present invention is to solve the problem of weakening durability of a pouch, which may occur in a process of forming cups having different depths in the pouch.

Also, another object of the present invention is to allow a pouch type secondary battery to increase in capacity in comparison to a pouch type secondary battery according to the related art.

Technical Solution

According to a first aspect of the present invention so as to achieve the above object, a method for manufacturing a pouch for a secondary battery includes: a step of preparing the pouch for accommodating an electrode assembly; a first forming step of initially pressing two areas spaced apart from each other on the pouch to form respective concave portions, each of which is concavely recessed to have respective first and second depths each equal to an initial constant depth, so as to respectively form a first cup and a second cup that are spaced apart from each other; and a second forming step of further pressing the first cup to increase the first depth of the first cup to a final depth greater than the initial constant depth.

During the first forming step, the concave portion of the first cup and the concave portion of the second cup may have the same depth.

During the first forming step, the concave portion of the first cup and the concave portion of the second cup may be formed at the same time.

A single forming part may be used to form the first cup during the first forming step and to increase the first depth of the first cup during the second forming step.

A first forming part may be used to form the first cup during the first forming step and a second forming part different from the first forming part may be used to increase the first depth of the first cup during the second forming step.

A sum of the first depth of the concave portion of the first cup and the second depth of the concave portion of the second cup may exceed 9.0 mm and be equal to or less than 11.5 mm.

During the second forming step, the first depth of the concave portion of the first cup may exceed 4.5 mm and be equal to or less than 10.0 mm, and the second depth of the concave portion of the second cup may be equal to or greater than 1.0 mm and equal to or less than 3.0 mm.

According to a second aspect of the present invention so as to achieve the above object, a pouch for a secondary battery includes: first and second cups, each of which has a concave portion; and an inter-area formed of material of the pouch extending between the first cup and the second cup, wherein the pouch is folded in the inter-area so that the concave portions of the first and second cups face each other, and a sum of a first depth of the concave portion of the first cup and a second depth of the concave portion of the second cup exceeds 9.0 mm and is equal to or less than 11.5 mm.

The first depth of the concave portion of the first cup may exceed 4.5 mm and be equal to or less than 10.0 mm, and the second depth of the concave portion of the second cup may be equal to or greater than 1.0 mm and equal to or less than 3.0 mm.

A ratio of the first depth of the concave portion of the first cup to the second depth of the concave portion of the second cup may range of 1.33 to 10.

The inter-area may consist of only a first curved area that is an area extending from the first cup and has a curved surface and a second curved area that is an area extending from the second cup and has a curved surface.

The first curved area may have a curve length of 1.5 mm in a plane extending through the first cup and the second cup, and the second curved area may have a curve length of 0.5 mm in the plane.

According to a third aspect of the present invention so as to achieve the above object, a method for manufacturing a secondary battery includes: a step of preparing a pouch for accommodating an electrode assembly; a first forming step of initially pressing two areas spaced apart from each other on the pouch to form respective concave portions, each of which is concavely recessed to have respective first and second depths each equal to an initial constant depth, so as to respectively form a first cup and a second cup that are spaced apart from each other; a second forming step of further pressing the first cup to increase the first depth of the first cup to a final depth greater than the initial constant depth; a step of accommodating the electrode assembly in the first cup or the second cup; and a folding step of folding the pouch in an inter-area formed of material of the pouch extending between the first cup and the second cup so that the concave portions of the first cup and the second cup face each other so as to accommodate the electrode assembly in the first cup and the second cup.

Advantageous Effects

According to the present invention, the problem of weakening the durability of the pouch, which may occur in the process of forming the cups having different depths in the pouch may be solved.

In addition, according to the present invention, the pouch type secondary battery may increase in capacity in comparison to the pouch type secondary battery according to the related art.

MODE FOR CARRYING OUT THE INVENTION

Figure 1:
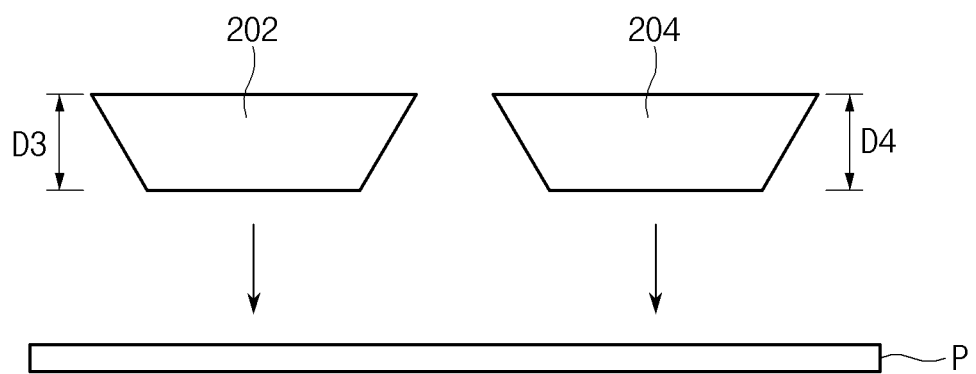
FIG. 1 is a side view illustrating a first forming step in a method for manufacturing a pouch, in which a plurality of cups having different depths is formed, according to an example of the present invention.

Hereinafter, a method for manufacturing a secondary battery according to the present invention will be described with reference to the accompanying drawings.

In this specification, a first cup is denoted by reference numerals 102' and 102. Here, the first cup denoted by the reference numeral 102' means a first cup after a first forming step and before a second forming step, which will be described below, and the first cup denoted by the reference numeral 102 means a first cup after the first forming step and the second forming step, which will be described below.

Method for Manufacturing Secondary Battery

FIG. 1 is a side view illustrating a first forming step in a method for manufacturing a pouch, in which a plurality of cups having different depths is formed, according to an example of the present invention.

A method for manufacturing a secondary battery according to an example of the present invention may include a step of preparing a pouch as an exterior accommodating an electrode assembly. As illustrated in FIG. 1, the pouch P may have a flat plate shape. Also, the pouch P may have a constant thickness throughout the pouch. The pouch may have a thickness of 60 μm to 200 μm, for example, 60 μm to 160 μm.

Also, the pouch may have a structure in which a plurality of layers is laminated. For example, in FIG. 1, the pouch may include a first polymer layer, a metal layer, and a second polymer layer, which are sequentially laminated upward. Here, the metal layer may be an aluminum layer, and a polymer used for each of the first and second polymer layers may be nylon, polypropylene (PP), polyethylene terephthalate (PET), or a combination thereof.

Also, as illustrated in FIG. 1, the method for manufacturing the secondary battery according to an example of the present invention may include a first forming step of pressing two areas spaced apart from each other on the pouch P to form concave portions, each of which is concavely recessed to have a constant depth (see FIG. 2) so as to form a first cup and a second cup which are spaced apart from each other.

Figure 2:
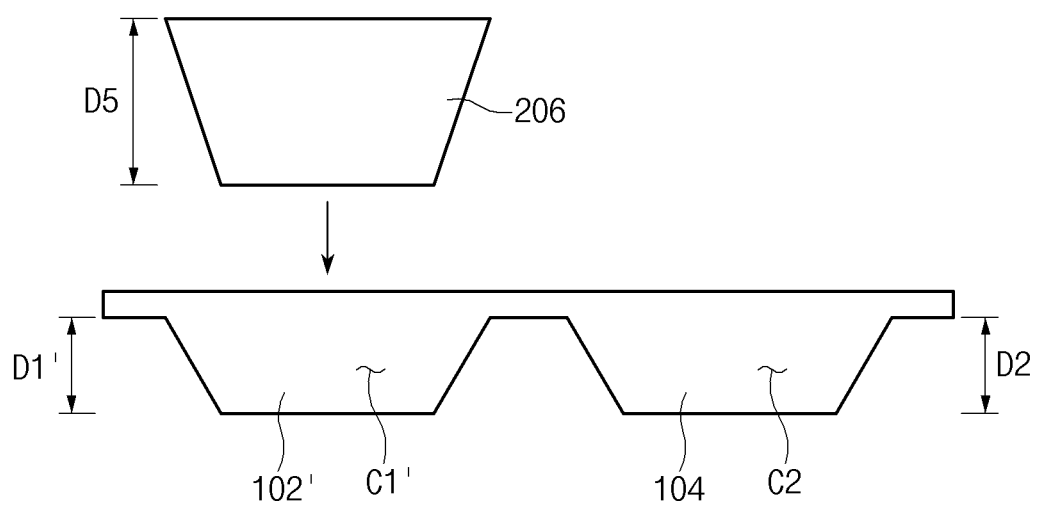
FIG. 2 is a side view illustrating a second forming step in the method for manufacturing the pouch, in which the plurality of cups having different depths is formed, according to an example of the present invention.

After the first forming step, the first cup 102' and the second cup 104, which respectively have the concave portion C1' having a depth D1' and the concave portion C2 having a depth D2, may be formed in the pouch P in pouch shapes illustrated in FIG. 2. Although the depths D1' and D2 of the concave portions respectively formed in the first cup 102' and the second cup 104 in the first forming step may be the same, the depths D1' and D2 may be different from each other. For example, the depth D1' may be greater or less than the depth D2.

When the depths D1' and D2 of the concave portions of the first cup 102' and the second cup 104 are the same in the first step, the first cup and the second cup are symmetrical to each other to prevent the pouch from being lean in a specific direction after the first forming step.

In this specification, means that sizes, depths, or thicknesses of the two configurations are the same should be understood that those skilled in the art will appreciate that the sizes, the depths, or the thicknesses of the two configurations are substantially the same even though the sizes of the two configurations are not exactly the same.

As described above, in the first forming step, the two areas spaced apart from each other on the pouch P may be pressed to form the first cup and the second cup. The pressing of the two areas on the pouch as described above may be performed by a first forming part 202 and a second forming part 204 as illustrated in FIG. 1. That is, the first cup 102' may be formed by the first forming part 202, and the second cup 104 may be formed by the second forming part 204. In FIG. 1, the first forming part 202 having a thickness D3 and the second forming part 204 having a thickness D4 are illustrated. Also, in the first forming step, since the first forming part 202 forms the first cup 102', and the second forming part 204 forms the second cup 104, the first forming part may have a thickness (i.e., D3) corresponding to the depth (i.e., D1') of the first concave portion C1' of the first cup after the first forming step, and the second forming part may have a thickness (i.e., D4) corresponding to the depth (i.e., D2) of the concave portion C2 of the second cup after the first forming step. Thus, although the thickness D3 of the first forming part and the thickness D4 of the second forming part 204 may be the same, the thicknesses D3 and D4 may be different from each other. For example, the thickness D3 may be greater or less than the thickness D4.

Also, in the first forming step according to the present invention, the concave portion of the first cup 102' and the concave portion of the second cup 104 may be formed at the same time. That is, in the first forming step, the processes of forming the first cup 102' and the second cup 104 through the first forming part 202 and the second forming part 204 may be performed at the same time. Also, in the first forming step, the depth of the concave portion C1' of the first cup and the depth of the concave portion C2 of the second cup may be the same.

When the processes of forming the first cup and the second cup by using the first forming part and the second forming part are temporally separately performed, a leaning phenomenon of the pouch may occur. For example, in the first forming step, when the first forming part presses first the pouch to form the first cup, and then, the second forming part presses the pouch to form the second cup, the pouch may be lean to the first cup that is formed first by the first forming part. However, when the processes of forming the first cup and the second cup by using the first forming part and the second forming part are performed at the same time, the leaning phenomenon of the pouch may be prevented from occurring.

FIG. 2 is a side view illustrating a second forming step in the method for manufacturing the pouch, in which the plurality of cups having different depths is formed, according to an example of the present invention.

As illustrated in FIG. 2, the method for manufacturing the secondary battery according to an example of the present invention may further include a second forming step of additionally pressing the first cup 102' formed in the first forming step to form a first cup 102 in which a concave portion C1 having a depth (i.e., D1) different from the depth (i.e., D1') of the concave portion C1' of the first cup 102' formed in the first forming step is formed. Similar to the first forming step, in the second forming step, the additional pressing of the first cup 102' may be performed by a third forming part 206.

Thus, the depth D1 may be greater than that of each of the depths D1' and D2.

Figure 3:
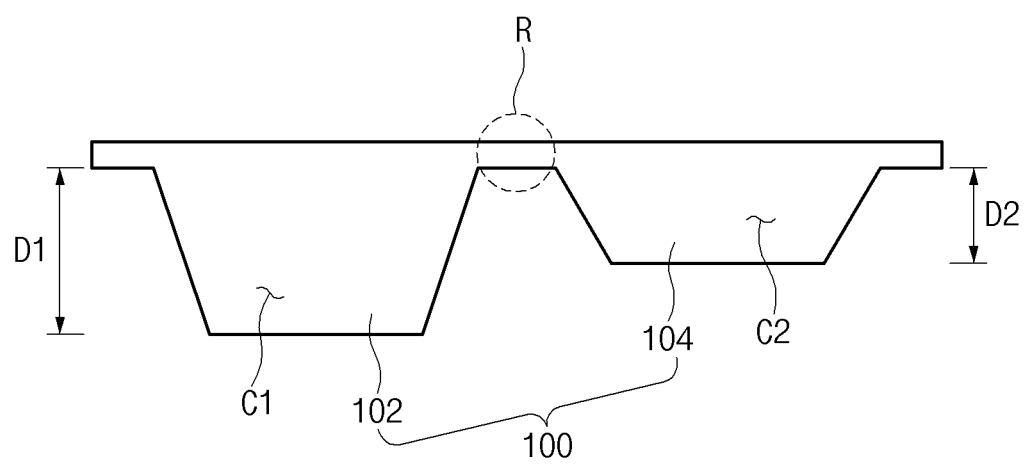
FIG. 3 is a side view of the pouch, in which the plurality of cups having different depths is formed, according to an example of the present invention.

FIG. 3 is a side view of the pouch, in which the plurality of cups having different depths is formed, according to an example of the present invention.

That is, in the first forming step according to an example of the present invention, the first cup 102' having the concave portion C1' having the depth D1' may be additionally pressed in the second forming step to form the first cup 102 having the concave portion C1 having the deeper depth (i.e., D1), thereby manufacturing the exterior pouch for the secondary battery having an asymmetrical shape in which the concave portions have depths different from each other. Here, a distance between the first cup 102 and the second cup 104 may be 2.0 mm to 6.0 mm, preferably, 2.0 mm to 4.0 mm. When the distance between the first cup 102 and the second cup 104 is excessively short, folding is not properly performed in a process of manufacturing the pouch type secondary battery by folding an area between the first cup and the second cup to cause a failure. When the distance between the first cup 102 and the second cup 104 is excessively long, the pouch increases in volume to reduce a capacity per unit volume of the secondary battery.

The forming part forming the first cup 102' in the first forming step and the forming part forming the first cup 102' in the second forming step may be different from each other. That is, referring to FIGS. 1 and 2, the first forming part 202 and the third forming part 206 may be provided as separate constituents. In FIGS. 1 and 2, the first forming part 202 having a thickness D3 and the third forming part 206 having a thickness D5 which is greater than a thickness D3 are illustrated.

However, on the other hands, the forming part forming the first cup 102' in the first forming step and the forming part pressing the first cup 102' in the second forming step may be the same. That is, the first forming part 202 and the third forming 206 may be the same. When the first forming part 202 and the third forming part 206 are the same, the constituents for preforming the method for manufacturing the secondary battery according to the present invention may be simplified.

After the first forming step and the second forming step according to an example of the present invention, a cup 100 including the first cup 102 and the second cup 104, which are spaced by an inter-area R from each other is formed in the pouch.

After the first forming step and the second forming step, the depth of the concave portion of the first cup formed in the pouch and the depth of the concave portion of the second cup formed in the pouch may have a constant ratio therebetween. For example, a ratio of the depth of the concave portion of the first cup to the depth of the concave portion of the second cup may range of 1.33 to 10. More preferably, a ratio of the depth of the concave portion of the first cup to the depth of the concave portion of the second cup may range of 4 to 10, 2 to 4.75, or 1.33 to 2.67.

When the ratio of the depth of the concave portion of the first cup to the depth of the concave portion of the second cup is out of the above ranges, i.e., the depth of the concave portion of the first cup increases, cracks may occur in the pouch. When the ratio of the depth of the concave portion of the first cup to the depth of the concave portion of the second cup is out of the above ranges, i.e., the depth of the concave portion of the first cup decreases, the depths of the cups of the pouch may not be sufficiently secured, and thus, the secondary battery may not sufficiently increase in capacity.

On the other hand, when the ratio of the depth of the concave portion of the first cup to the depth of the concave portion of the second cup is out of the above ranges, i.e., the depth of the concave portion of the second cup decreases, the depths of the cups of the pouch may not be sufficiently secured, and thus, the secondary battery may not sufficiently increase in capacity. When the ratio of the depth of the concave portion of the first cup to the depth of the concave portion of the second cup is out of the above ranges, i.e., the depth of the concave portion of the second cup increases, cracks may occur in the pouch. The numerical range of the ratio of the depth of the concave portion of the first cup to the depth of the concave of the second cup may be supported by Embodiments 1 to 3, which will be described below.

The inter-area R may include a first curved area having a curved surface as an area connected to the first cup 102, a second curved area having a curved surface as an area connected to the second cup 104, and a planar area having a plane and formed between the first curved area and the second curved area. When the area to which the first cup 102 and the inter-area R are connected and the area to which the second cup 104 and the inter-area R are connected are angled, the cracks may occur in the angled areas, or each of the angled areas may be broken. The first curved area and the second curved area may be constituents for solving the above problem. That is, since the first curved area and the second curved area are formed, the area to which the first cup 102 and the inter-area R are connected and the area to which the second cup 104 and the inter-area R are connected may be smoothly connected to improve durability of the pouch.

That the inter-area includes the first curved area and the second curved area may be regarded as reflecting characteristics of the process of manufacturing the middle- or large-sized pouch type secondary battery to which the present invention is capable of being applied. That is, in the case of a pouch used for a pouch type secondary battery having a middle or large capacity in comparison to a pouch used for a pouch type secondary battery having a small capacity, since a thickness of a concave portion of a formed cup is relatively large, a degree of deformation of the pouch is also large. As a result, the pouch may commonly have a relatively thick thickness. Thus, while the cup is formed in the pouch used for the pouch type secondary battery having the middle or large capacity, a curved area may be formed between the cups and thus be reflected to the curved areas according to the present invention.

On the other hand, a material constituting the pouch used for the pouch type secondary battery having the small capacity usually has a thickness of 60 μm, i.e., a relatively thin thickness. Thus, since a degree of flatness of the pouch is relatively small in the process of forming the cup, the pouch may be formed without forming the curved area between the cups.

Thus, the present invention may be applied to the pouch type secondary battery having the middle or large capacity. That is, according to the present invention, the inter-area between the cups, which is necessarily formed on the pouch in the process of manufacturing the pouch type secondary battery having the middle or large capacity, may be minimized to minimize a portion protruding to the outside by the inter-area, thereby maximizing the capacity of the pouch type secondary battery having the middle or large capacity.

On the other hand, unlike the above-described structure, the inter-area R may have only the first curved area and the second curved area without having the planar area. In this case, since an area occupied by the planar area on the inter-area R is removed, the inter-area R may be minimized in surface area and length. In this case, as described below, when the pouch is folded with respect to the inter-area R to manufacture the pouch type secondary battery, a portion protruding in a width direction of the secondary battery may be minimized by the inter-area to maximize a surface area per unit volume. Here, as described above, a distance (i.e., a length of the inter-area) between the first cup and the second cup may be 2.0 mm to 6.0 mm or 2.0 mm to 4.0 mm Here, in order to maximize the surface area per unit volume of the secondary battery, the length of the inter-area (i.e., the sum of a length of the first curved area and a length of the second curved surface) may be 2.0 mm.

According to the present invention, the phenomenon, in which the pouch leans in one direction while the plurality of cups having the concave portions having depths different from each other is formed, may be prevented from occurring to prevent the cracks from occurring between the area (i.e., the inter-area R) between the cups, thereby improving the durability of the pouch and the secondary battery.

That is, the first cup and the second cup may be formed in the first forming step to prevent the material constituting the pouch from leaning in a specific direction. Thereafter, in the second forming step, the concave portion of the first cup may have a deeper depth through the additional pressing. Here, since the first cup and the second cup are formed first in the first forming step, the material constituting the pouch may not lean to a direction of the first cup even though the first cup is additionally pressed in the second forming step.

The method for manufacturing the secondary battery according to an example of the present invention may further include a folding step of folding the first cup 102 and the second cup 104 with respect to the inter-area R so that the first cup 102 and the second cup 104 face each other so as to accommodate the electrode assembly in the first cup and the second cup after the first forming step and the second forming step.

The pouch manufactured according to the method for manufacturing the secondary battery according to an example of the present invention may be a pouch used for a secondary battery having a middle or large capacity. For this, when viewing the pouch from an upper side after the folding step (i.e., when viewing the pouch from an upper side in FIGS. 1 to 3), the pouch may have a rectangular circumference. The pouch having the rectangular shape when viewed from the upper side may have a horizontal side having a length of 100 mm to 500 mm and a vertical side having a length of 100 mm to 500 mm. For example, the pouch having the rectangular shape may have a horizontal side having a length of 100 mm to 300 mm and a vertical side having a length of 100 mm to 300 mm.

As described above, since the pouch manufactured according to an example of the present invention is the pouch used for the secondary battery having the middle or large capacity, the material constituting the pouch may also have a predetermined thickness matching the above-described range. Thus, as described above, the material constituting the pouch may have a thickness of 60 to 200 μm, for example, 100 μm to 160 μm.

Also, when viewing the pouch from the upper side, the pouch may have the rectangular shape or a square shape.

The method for manufacturing the secondary battery according to the present invention will be described based on the above-described structure.

A method for manufacturing a secondary battery according to the present invention may include: a step of preparing a pouch for accommodating an electrode assembly; a first forming step of pressing two areas spaced apart from each other on the pouch to form concave portions, each of which is concavely recessed to have a constant depth, so as to form a first cup and a second cup, which are spaced apart from each other; a second forming step of additionally pressing the first cup to form a first cup having a concave portion having a depth different from that of the concave portion of the first cup formed in the first forming step; a step of accommodating the electrode assembly in the first cup or the second cup; and a folding step of folding the first cup and the second cup with respect to an inter-area R formed between the first cup and the second cup so that the first cup and the second cup face each other so as to accommodate the electrode assembly in the first cup and the second cup.

Embodiment 1

A laminate sheet having a thickness 150 μm was pressed to form a first cup and a second cup, thereby manufacturing a pouch. The laminate sheet used a laminate sheet in which a nylon layer having a thickness of 30 μm, an aluminum layer having a thickness of 40 μm, and a PP layer having a thickness of 80 μm are sequentially laminated upward.

Each of the first cup and the second cup was formed by pressing the laminate sheet by using a mold. In Embodiment 1, the mold pressed the laminate sheet at a pressure of 0.5 Mpa and a speed of 40 mm/sec.

In a first forming step, the first cup and the second cup were formed until each of a concave portion of the first cup and a concave portion of the second cup has a depth of 1.0 mm. Then, in a second forming step, the laminate sheet constituting the first cup was additionally pressed to form nine pouches in which first cups have concave portions respectively having depths of 4.0 mm, 5.0 mm, 6.0 mm, 7.0 mm, 8.0 mm, 9.0 mm, 10.0 mm, 10.5 mm, and 11.0 mm.

Here, an inter-area between the first cup and the second cup had a length of 2.0 mm That is, a first curved surface of the inter-area, which is connected to the first cup and has a curved surface, had a length of 1.5 mm, and a second curved surface of the inter-area, which is connected to the second cup and has a curved surface, had a length of 0.5 mm A planar area was not formed between the first curved area and the second curved area.

After the pouch manufactured as described above, when viewing the pouch from an upper side, the pouch had a rectangular circumference having a horizontal side of 100 mm and a vertical side of 250 mm.

Embodiment 2

A thickness of a laminate sheet, a thickness of each of layers constituting the laminate sheet, and a material of each of the layers constituting the laminate sheet according to Embodiment 2 were the same as those according to Embodiment 1. A pressure and pressing speed of a mold pressing the laminate sheet were also the same as those according to Embodiment 1.

In a first forming step, a first cup and a second cup were formed until each of a concave portion of the first cup and a concave portion of the second cup has a depth of 2.0 mm. Then, in a second forming step, the laminate sheet constituting the first cup was additionally pressed to form nine pouches in which first cups have concave portions respectively having depths of 4.0 mm, 5.0 mm, 6.0 mm, 7.0 mm, 8.0 mm, 9.0 mm, 9.5 mm, 10.0 mm, and 10.5 mm.

Here, an inter-area between the first cup and the second cup had a length of 2.0 mm That is, a first curved surface of the inter-area, which is connected to the first cup and has a curved surface, had a length of 1.5 mm, and a second curved surface of the inter-area, which is connected to the second cup and has a curved surface, had a length of 0.5 mm A planar area was not formed between the first curved area and the second curved area.

After the pouch manufactured as described above, when viewing the pouch from an upper side, the pouch had a rectangular circumference having a horizontal side of 100 mm and a vertical side of 250 mm.

Embodiment 3

A thickness of a laminate sheet, a thickness of each of layers constituting the laminate sheet, and a material of each of the layers constituting the laminate sheet according to Embodiment 3 were the same as those according to Embodiment 1. A pressure and pressing speed of a mold pressing the laminate sheet were also the same as those according to Embodiment 1.

In a first forming step, a first cup and a second cup were formed until each of a concave portion of the first cup and a concave portion of the second cup has a depth of 3.0 mm. Then, in a second forming step, the laminate sheet constituting the first cup was additionally pressed to form eight pouches in which first cups have concave portions respectively having depths of 4.0 mm, 5.0 mm, 6.0 mm, 7.0 mm, 8.0 mm, 8.5 mm, 9.0 mm, and 10.0 mm.

Here, an inter-area between the first cup and the second cup had a length of 2.0 mm That is, a first curved surface of the inter-area, which is connected to the first cup and has a curved surface, had a length of 1.5 mm, and a second curved surface of the inter-area, which is connected to the second cup and has a curved surface, had a length of 0.5 mm A planar area was not formed between the first curved area and the second curved area.

After the pouch manufactured as described above, when viewing the pouch from an upper side, the pouch had a rectangular circumference having a horizontal side of 100 mm and a vertical side of 250 mm.

Comparative Example

A thickness of a laminate sheet, a thickness of each of layers constituting the laminate sheet, and a material of each of the layers constituting the laminate sheet according to Comparative Example were the same as those according to Embodiment 1. A pressure and pressing speed of a mold pressing the laminate sheet were also the same as those according to Embodiment 1.

In Comparative Example, a concave portion of a first cup and a concave portion of a second cup had the same depth. Here, the concave portion of the first cup and the concave portion of the second cup were formed at the same time. In Comparative Example, seven pouches having in which the concave portions of the first cups and the concave portion of the second cups respectively have depths of 1.0 mm, 2.0 mm, 3.0 mm, 4.0 mm, 4.5 mm, 5.0 mm, 5.5 mm.

Here, an inter-area between the first cup and the second cup had a length of 3.0 mm That is, a first curved surface of the inter-area, which is connected to the first cup and has a curved surface, had a length of 1.5 mm, and a second curved surface of the inter-area, which is connected to the second cup and has a curved surface, had a length of 1.5 mm A planar area was not formed between the first curved area and the second curved area.

Experimental Example

Whether cracks occur in the pouches for the secondary battery, which are manufactured according to Embodiments 1 to 3 and Comparative Example was determined. Whether the cracks occur in the pouches was determined based on whether pin holes are formed in the pouches, and whether the pin holes are formed was observed with naked eyes and turned up the light. That is, when the pin hole is formed in the pouch for the secondary battery, which includes the first cup and the second cup, it was determined that the cracks occur. When the pin hole is not formed in the pouch for the secondary battery, which includes the first cup and the second cup, it was determined that the cracks do not occur.

Experimental results of the pouches for the secondary batteries manufactured by Embodiments 1 to 3 are shown in Table 1 below, and experimental results of the pouch for the secondary battery according to Comparative Example is shown in Table 2 below.

In Table 1 and Table 2, reference symbols 'a/b (where a and b are figures)' means that a times of cracks occur in b times of experiments to form the corresponding cup.

TABLE 1

| Formed depth of first cup | Crack occurrence and crack occurrence frequency | | |
|---|---|---|---|
| (mm) | Embodiment 1 | Embodiment 2 | Embodiment 3 |
| 4.0 | X(0/3) | X(0/3) | X(0/3) |
| 5.0 | X(0/3) | X(0/3) | X(0/3) |
| 6.0 | X(0/3) | X(0/3) | X(0/3) |
| 7.0 | X(0/3) | X(0/3) | X(0/3) |
| 8.0 | X(0/3) | X(0/3) | X(0/3) |
| 8.5 | — | — | ○(2/5) |
| 9.0 | X(0/3) | X(0/3) | ○(4/5) |
| 9.5 | — | X(0/3) | — |
| 10.0 | X(0/3) | ○(4/5) | ○(5/5) |
| 10.5 | ○(2/5) | ○(5/5) | — |
| 11.0 | ○(5/5) | — | — |
| Maximum value of depth of first cup + depth of second cup | 11.0 mm | 11.5 mm | 11.0 mm |

TABLE 2

| Formed depth of first cup and second cup (mm) | Crack occurrence and crack occurrence frequency Comparative Example |
|---|---|
| 1.0 | X(0/3) |
| 2.0 | X(0/3) |
| 3.0 | X(0/3) |
| 4.0 | X(0/3) |
| 4.5 | X(0/3) |
| 5.0 | ○(2/5) |
| 5.5 | ○(4/5) |
| Maximum value of depth of first cup + depth of second cup | 9.0 mm |

As shown in Table 2, when in the pouch for secondary battery, which is manufactured according to Comparative Example, particularly, when the concave portions of the first cup and the second cup have the same depth, it has been confirmed that there is a considerable limitation in maximizing the sum of the depth of the concave portion of the first cup and the depth of the concave portion of the second cup. That is, referring to Table 1, when the concave portion of the first cup and the concave portion of the second cup according to Comparative Example have the same depth, it is confirmed that the depth of each of the first cup and the second cup has a maximum value of 4.5 mm, and the sum of the depths of the first and second cups has a maximum value of 9.0 mm That is, according to Comparative Example, when the depth of each of the first cup and the second cup exceeds 4.5 mm, it is seen that the cracks occur in the pouch.

The sum of the thickness of the first cup and the depth of the second cup is directly related to the thickness of the pouch type secondary battery. Thus, the more the sum of the thickness of the first cup and the depth of the second cup increases, the more the thickness of the electrode assembly provided in the pouch may increase to maximize the capacity of the pouch type secondary battery. From this point of view, the pouch type secondary battery to which the pouch for the secondary battery manufactured according to Comparative Example is limited to the capacity corresponding to the sum (i.e., 9.0 mm) of the thickness of the first cup and the thickness of the second cup.

However, when the pouch type secondary battery is manufactured by using the pouch for the secondary battery, which is manufactured according to Embodiments 1 to 3, it is seen that the secondary battery significantly increases in capacity. That is, it is seen that the sum of the depth of the first cup and the depth of the second cup has a maximum value of 11.0 mm in the pouch for the secondary battery according to Embodiment 1 of the present invention, the sum of the depth of the first cup and the depth of the second cup has a maximum value of 11.5 mm in the pouch for the secondary battery according to Embodiment 2 of the present invention, and the sum of the depth of the first cup and the depth of the second cup has a maximum value of 11.0 mm in the pouch for the secondary battery according to Embodiment 3 of the present invention. Thus, when compared to Comparative Example, in the case of Embodiments 1 and 3, the capacity may increase by about 22%, and in the case of Embodiment 2, the capacity may increase by about 27.8% (here, it is assumed that other standards of the pouches according to Embodiments 1 to 3 are the same).

Particularly, in the case in which the pouch for the secondary battery is manufactured according to Comparative Example, the depth of each of the first cup and the second cup does not exceed 4.5 mm. However, in the case in which the pouch for the secondary battery is manufactured according to Embodiments 1 to 3, it is seen that the depth of the first cup having a relatively deep depth exceeds 4.5 mm and increase up to 10.0 mm.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A method for manufacturing a pouch for a secondary battery, the method comprising:
preparing the pouch for accommodating an electrode assembly;
a first forming step of initially pressing two areas spaced apart from each other on the pouch to form respective concave portions, each of which is concavely recessed to have respective first and second depths each equal to an initial constant depth, so as to respectively form a first cup and a second cup that are spaced apart from each other; and
a second forming step of further pressing the first cup to increase the first depth of the first cup to a final depth greater than the initial constant depth.

2. The method of claim 1, wherein, during the first forming step, the concave portion of the first cup and the concave portion of the second cup are formed at the same time.

3. The method of claim 1, wherein a single forming part is used to form the first cup during the first forming step and to increase the first depth of the first cup during the second forming step.

4. The method of claim 1, wherein a first forming part is used to form the first cup during the first forming step and a second forming part different from the first forming part is used to increase the first depth of the first cup during the second forming step.

5. The method of claim 1, wherein, during the second forming step, a sum of the first depth of the concave portion of the first cup and the second depth of the concave portion of the second cup exceeds 9.0 mm and is equal to or less than 11.5 mm.

6. The method of claim 5, wherein, during the second forming step, the first depth of the concave portion of the first cup exceeds 4.5 mm and is equal to or less than 10.0 mm, and the second depth of the concave portion of the second cup is equal to or greater than 1.0 mm and equal to or less than 3.0 mm.

7. A pouch for a secondary battery manufactured according to the method of claim 1, the pouch comprising:
the first and second cups, each of which has a concave portion; and
an inter-area formed of material of the pouch extending between the first cup and the second cup,
wherein pouch is folded in the inter-area so that the concave portions of the first and second cups face each other, and a sum of the final depth of the concave portion of the first cup and the second depth of the concave portion of the second cup exceeds 9.0 mm and is equal to or less than 11.5 mm.

8. The pouch of claim 7, wherein the final depth of the concave portion of the first cup exceeds 4.5 mm and is equal to or less than 10.0 mm, and the second depth of the concave portion of the second cup is equal to or greater than 1.0 mm and equal to or less than 3.0 mm.

9. The pouch of claim 7, wherein a ratio of the final depth of the concave portion of the first cup to the second depth of the concave portion of the second cup ranges of 1.33 to 10.

10. The pouch of claim 7, wherein the inter-area consists of only a first curved area that is an area extending from the first cup and has a curved surface and a second curved area that is an area extending from the second cup and has a curved surface.

11. The pouch of claim 10, wherein the first curved area has a curve length of 1.5 mm in a plane extending through both the first cup and the second cup, and the second curved area has a curve length of 0.5 mm in the plane.

12. A method for manufacturing a secondary battery, the method comprising:
preparing a pouch for accommodating an electrode assembly;
initially pressing two areas spaced apart from each other on the pouch to form respective concave portions, each of which is concavely recessed to have respective first and second depths each equal to an initial constant depth, so as to respectively form a first cup and a second cup that are spaced apart from each other;
further pressing the first cup to increase the first depth of the first cup to a final depth greater than the initial constant depth;
accommodating the electrode assembly in the first cup or the second cup; and
folding the pouch in an inter-area formed of material of the pouch extending between the first cup and the second cup so that the concave portions of the first cup and the second cup face each other so as to accommodate the electrode assembly in the first cup and the second cup.

13. A secondary battery comprising:
the pouch of claim 7; and
an electrode assembly accommodated in the pouch.

* * * * *